United States Patent [19]

Southwell

[11] Patent Number: 4,536,063

[45] Date of Patent: Aug. 20, 1985

[54] TRANSMISSIVE PHASE RETARDER

[75] Inventor: William H. Southwell, Thousand Oaks, Calif.

[73] Assignee: Rockwell International Corporation, El Segundo, Calif.

[21] Appl. No.: 702,865

[22] Filed: Feb. 20, 1985

Related U.S. Application Data

[63] Continuation of Ser. No. 449,791, Dec. 14, 1982, abandoned.

[51] Int. Cl.³ ............................ G02B 5/30; G02B 1/10
[52] U.S. Cl. ..................................... 350/395; 350/164
[58] Field of Search ........ 350/164, 166, 320, 394–395, 350/406

[56] References Cited

U.S. PATENT DOCUMENTS

| | | | |
|---|---|---|---|
| 3,781,090 | 12/1973 | Sumita | 350/164 |
| 3,858,965 | 1/1975 | Sumita | 350/164 |
| 4,312,570 | 1/1982 | Southwell | 350/394 |

OTHER PUBLICATIONS

Southwell, W. H., "Multilayer Coating Design Achieving a Broad Band 90° Phase Shift", App. Optics, 8-1980, pp. 2688-2692.
Southwell, W. H., "Multilayer High Reflective Coating Designs Achieving Broadband 90° Phase Change", Proc. Soc. Photo-Opt. Instrum. Eng. (U.S.A.), SPIE, vol. 190, LASL Optics Conf. 1979, pp. 81–88.
Krylova, T. N., "The Reflection of Light from a Coated Surface at Various Angles of Incidence", Soviet Jr. Opt. Tech., 11, 12-1968, pp. 695-698.
Dobrowolski, J. A., "Completely Automatic Synthesis of Optical Thin Film Systems", App. Optics, 8-1965, pp. 937-946.
MacLeod, H. A., "Turning Value Monitoring of Narrow-Band All-Dielectric Thin-Film Filters", Optica Acta, 1972, pp. 1-28.

Primary Examiner—William H. Punter
Attorney, Agent, or Firm—H. Fredrick Hamann; Harry B. Field

[57] ABSTRACT

The present invention is a transmissive phase retarder in which reflection of an incident beam of light is substantially reduced and in which the incident light experiences a phase retardation between the s- and p-plane polarization components of the transmitted light. The transmissive phase retarder includes a transmissive substrate, such as glass, and a plurality of superimposed thin film transparent layers on the transmissive substrate. The adjacent layers of the superimposed thin film layers are made of materials of substantially different indices of refraction, $n_i$. The optical thicknesses, $f_i$, of the layers are prescribed so that they satisfy the transmission and retardation requirements in order to produce both maximum transmission and a specified phase shift, $\Phi_i$, in the s- and p-plane polarization components of the transmitted light for a broadband range of wavelengths at a specified angle of incidence, $\theta_{os}$, by minimizing a merit function by adjusting the optical thickness, $f_i$, of each layer wherein the merit function, $$M = \sum_{\lambda_i} \{[(\Phi_s - \Phi(f_i))/\Phi_i]^2 + [(1 - T_s(f_i))/T_{si}]^2 + [(1 - T_p(f_i))/T_{pi}]^2\},$$

where $\Phi(f_i)$, and $T_s(f_i)$ and $T_p(f_i)$ are standard functions for determining the phase retardation, the transmission of the s-plane polarization component and the transmission of the p-plane polarization component of transmitted light, respectively, for a particular set of wavelengths, $\lambda_i$.

5 Claims, 1 Drawing Figure

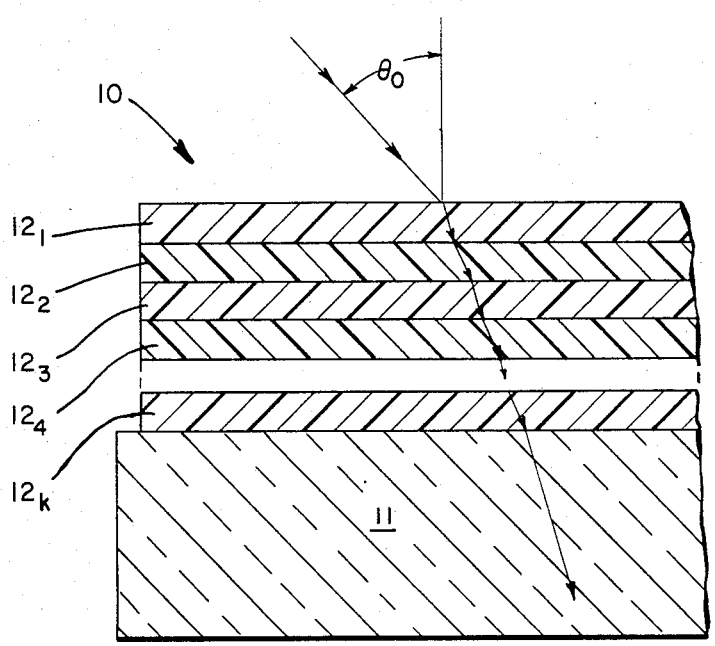

TRANSMISSIVE PHASE RETARDER

This is a continuation of co-pending application Ser. No. 449,791 filed on Dec. 14, 1982, now abandoned.

BACKGROUND OF THE INVENTION

1. Field of the Invention

The present invention relates to optical coatings on glass or other substrates and more particularly to coatings which control phase changes between the s- and p-plane polarization components of a transmitted beam of light.

2. Description of the Prior Art

The use of multi-layered dielectric coatings on glass surfaces to reduce reflectivity is well known in the prior art. U.S. Pat. No. 3,858,965, entitled Five Layer Anti-Reflection Coating, issued to Haruki Sumita on Jan. 7, 1975, teaches a multi-layered anti-reflection coating for use with a glass substrate which includes five layers of coating material each of which has an optical thickness of a preselected design wavelength and an index of refraction in a particular range. The optical thicknesses of the layers can be varied to compensate for any variations from the theoretical design indices of refraction. The multi-layered anti-reflection coating substantially reduces reflection from the surface of the glass substrate over a broad wavelength band. Although classical designs for anti-reflecting light of only one wavelength have been well established in the prior art, the novelty of this anti-reflection coating is that the layer thicknesses of its multi-layered configuration can be calculated using a computer in conjunction with a least squares algorithm in order to provide a broad band anti-reflection coating.

U.S. Pat. No. 4,142,958, entitled Method for Fabricating Multi-Layer Optical Films, issued to David T. Wei and Anthony W. Louderback on Mar. 6, 1979, teaches a method of fabricating multiple layer interference optical films by ion beam sputtering. The films are used for mirrors in a ring laser apparatus. The layers alternate between a material of high index of refraction, such as either tantalum pentoxide ($Ta_2O_5$) or titanium dioxide ($TiO_2$), and a material of low index of refraction, such as silicon dioxide ($SiO_2$), i.e., quartz. U.S. Pat. No. 2,519,722, entitled Metallic Mirror and Method of Making Same, issued to Arthur F. Turner on Aug. 22, 1950, teaches superimposed light-transmitting layers of non-metallic materials having low and high indices of refraction which are deposited alternately on a metallic reflecting surfaces so that each layer has a thickness of approximately the thickness of a quarter wave length of light in the portion of the spectrum from about 500 m$\mu$ to 600 m$\mu$. Quarter wave stacks and their design are explained in detail in the Military Standardization Handbook entitled "Optical Designs," MIL-HDBK-141, Oct. 5, 1962. Briefly, each layer or thin film coating in a quarter wave stack has a thickness of about one quarter of a wavelength of the light which the quarter wave stack is designed to reflect. Multilayer dielectric coatings can also be used to enhance the reflection of either glass or metallic surfaces. Since metallic surfaces are already good reflectors, only a few layers, such as either two or four layers, are needed to bring reflectivity to ninety-nine percent or higher. For glass surfaces, twenty or more layers are often used to produce highly reflective surfaces.

More recently, multilayer dielectric coating configurations have been invented which not only provide enhanced reflectivity for metals, but which also provide a means to produce a 90° phase shift between the s- and p-plane polarization components. The invention also utilized a computer to calculate the layer thicknesses to achieve the desired reflectivity and phase shift. No prior art had existed that predicted such a phase shift could be achieved. Since that invention, however, some attempts have been made to develop a theory for the reflective phase retarders. It should be noted that this theory pertains only to mirrors. In an article, entitled "Multilayer coating producing 90° phase change," published in *Applied Optics,* volume 18, number 11, on June 1, 1979, page 1875, William H. Southwell has discussed enhanced reflection dieletric coating for a metallic reflector. In another article, entitled "Multilayer coating design achieving a broadband 90° phase shift," published in *Applied Optics,* volume 19, number 16, on Aug. 15, 1980, pages 2688-2692, William H. Southwell has discussed the broadband 90° phase shift. In an article, entitled "Graphical method to design multilayer phase retarders," published in *Applied Optics,* volume 20, number 6, Mar. 15, 1981, pages 1024-1029, and an article, entitled "Phase retardance of periodic multilayer mirrors," published in *Applied Optics,* volume 21, number 4, pages 733-738, Joseph H. Apfel has discussed the theory of the formation of phase retarders.

U.S. Pat. No. 4,312,570, entitled High Reflectivity Coated Mirror Producing 90 Degree Phase Shift, issued to William H. Southwell on Jan. 26, 1982, teaches a high reflectivity mirror which produces a substantially 90 phase shift between s- and p-plane polarization components of the reflected light by applying a plurality of superimposed transparent layers on the reflective surface of a substrate. Adjacent layers are made out of materials of substantially different indices of refraction. The thickness of substantially all of the layers is less than a quarter wavelength at the center frequency of the incident light and the thickness of the layers differ from each in a predetermined manner to control and produce exactly 90° phase shift between the s- and p-plane polarization components while providing maximum reflectivity over a wide frequency band.

A phenomenon is known that when a light beam is reflected by the surface of a certain substance a phase difference is created between a s-plane polarization reflected component and an p-plane polarization reflected component. For example, when a light beam is reflected by the outer surface of a dielectric material a phase difference $\pi$ is created between the p-plane polarization reflected component and the s-plane polarization reflected component if the angle of incidence is smaller than the Brewster's angle. In the metals generally used for mirrors, namely aluminum, silver and chromium when a light beam is reflected by the surface thereof a phase difference of approximately $\pi$ is created between the s-plane polarization reflected component and the p-plane polarization reflected component. In this case, the angle of incidence at which the light beam is incident on the metal surface is about 45°, which is usually a standard value when the metal is used as a mirror.

U.S. Pat. No. 4,322,130, entitled Phase Shifting Mirror, issued to Susumu Ito and Mikichi Ban on Mar. 30, 1982, teaches a phase shifting mirror which includes a thin film layer of metal disposed on a substrate and a thin film layer of dieletric material disposed on the thin film layer of metal wherein the utilization of a phase difference between a s-plane polarization reflected component and an p-plane polarization reflected component reflecting from the reflection boundary surface between the thin film layer of metal and the thin film layer of dieletric material and variations in refractive index and film thickness of the dieletric material a desired phase difference is obtained between the s-plane polarization reflected component and the p-plane polarization reflected component.

U.S. Pat. No. 4,084,883, entitled Reflective Polarization Retarder and Laser Apparatus Utilizing Same, issued to Jay Morgan Eastman and Stanley J. Refermat on Apr. 18, 1979, teaches a reflective thin film polarization retardation device which permits obtaining phase retardation of light different amounts of which may be readily obtained. Retardation results from interference effects within thin film arrays within the device. A polarizer rotator includes a thin film reflective transmissive polarizer, a thin film reflector and a phase adjusting layer, which may be one or more thin film layers. The phase adjusting layer is sandwiched between the thin film polarizer and the thin film reflector. The thin films constituting the polarizer, phase adjusting layer and reflector may be successively deposited on of one of the planar faces of a substrate formed from laser glass with the films constituting the polarizer being deposited first. The s-plane polarization component of the incident light, which may be linearly polarized laser light, is reflected by the polarizer and the p-plane polarization component of the incident light is transmitted through the polarizer and the phase adjusting layer to the reflector. In the device which U.S. Pat. No. 4,084,883 teaches the approach is to use two classical concepts, a thin film polarizer and a spacer layer to provide a phase retardation in order to derive a phase shift. There is no necessity to use a computer in order to calculate the layer thicknesses in that there is a phase adjusting layer. U.S. Pat. No. 2,519,722 teaches the use of dielectric coatings on polished metals or other reflective surfaces to improve the reflectivity in which superimposed light-transmitting layers of nonmetallic materials are used having alternately low and high indices of refraction. The thickness of these thin films is held to a quarter wavelength of the incident light beam. Use of the thin film polarizers give the advantage of economy of manufacture, large apertures and broadband wavelength performance characteristics. A disadvantage, however, is that the beam has to bend since the phase retarders are on mirrors.

Previously birefringent crystals were required to form transmissive phase retarders. Quarter wave and half wave plates are examples of devices which performed phase retardations between two polarization components in a beam of light. The advantage of these crystals is that the beam does not have to bend since the beam travels through them. The disadvantage of these crystals is that they are not only expensive, but they are not useful for higher power laser beams. R. T. Denton, in a Chapter C6, entitled "Modulation Techniques", of Laser Handbook, published by North-Holland Publishing Company in 1972, described several commonly used crystals which are formed out of electo-optic materials, such as cadmium telluride (CdTe) and gallium arsenide (GaAs), and which have static birefringence such that phase retardation occurs even in the absence of an applied voltage. The waves travel through the crystals at different velocities.

U.S. Pat. No. 3,591,188, entitled Internally Modulated Laser, issued to Thomas A. Nussmeier on July 13, 1971, teaches an internal modulator which modulates a laser beam and which incorporates in a single element a polarizer and a retardation modulator. The retardation modulator is formed from a gallium arsenide crystal.

It is desirable to have a phase retarding device which has all of the advantages of the reflective phase retarders, but which would not deviate the light beam namely a transmissive phase retarder. It would also be desirable to provide tunability meaning that by a simple adjustment, such as a rotation of the device in a light beam so as to change the angle of incidence, a prescribed phase retardation could be achieved.

The present invention is an optical multilayer coating which reduces the unwanted reflection from the surface and which also produces a phase shift between the s- and p-plane polarization components of the transmitted light. The glass or other transparent substrate must be placed at some non-normal incidence angle to the beam of light in order to define the s- and p-components of an electric field. An additional feature of the coating designs described by this invention is that the adjustment of the angle of incidence provides the basis for a variable phase retardation device. By the use of this invention namely, the use of a computer to determine coating layer thicknesses so as to provide the anti-reflective properties as well as the desired phase shift properties, designs have been developed which allow the user of the device to select the phase retardation between 0° and 100° by adjusting the angle of incidence.

For information regarding mica and quartz retardation plates the inventor directs attention to Section 10, entitled "Polarization," of the *Handbook of Optics*, written by Jean M. Bennett and Harold E. Bennett, edited by Walter G. Driscoll and William Vaughan, published by McGraw-Hill Book Company in 1978.

SUMMARY OF THE INVENTION

In view of the foregoing factors and conditions which are characteristic of the prior art it is the primary object of the present invention to provide optical coatings on glass or other transmissive substrates which control phase changes between the s- and p-plane polarization components of a transmitted beam of light.

It is another object of the present invention to provide optical coatings on glass or other transmissive substrates which are tunable by a simple adjustment in order to obtain a prescribed phase retardation.

In accordance with the present invention an embodiment of a transmissive phase retarder in which reflection of an incident beam of light is substantially reduced and in which the incident light experiences a phase retardation between the s- and p-plane polarization components of the transmitted light is described. The transmissive phase retarder includes a transmissive substrate, such as glass, and a plurality of superimposed thin film transparent layers on the transmissive substrate. The adjacent layers of the superimposed thin film layers are made of materials of substantially different indices of refraction, $n_i$. The optical thicknesses, $f_i$, of the layers are prescribed so that they satisfy the transmission and retardation requirements in order to produce both maximum transmission and a specified phase shift, $\Phi_s$, in the s- and p-plane polarization components of the transmitted light for a broadband range of wavelength at a specified angle of incidence, $\theta_{0s}$, by minimizing a merit function by adjusting the optical thickness, $f_i$, of each layer wherein the merit function, $$M = \sum_{\lambda_i} \{[(\Phi_s - \Phi(f_i))/\Phi_t]^2 + [(1 - T_s(f_i))/T_{st}]^2 + [(1 - T_p(f_i))/T_{pt}]^2\},$$

where $\Phi(f_i)$, $T_s(f_i)$ and $T_p(f_i)$ are standard functions for determining the phase retardation, the transmission of the s-plane polarization component and the transmission of the p-plane polarization component, respectively, of transmitted light for a particular set of wavelengths, $\lambda_i$.

The features of the present invention which are believed to be novel are set forth with particularly in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

The drawing is a side elevational view in cross-section of an optical coating on a transparent substrate which has been constructed in accordance with the principles of the present invention and which is disposed at an angle of incidence, $\theta_0$, to an incoming beam of light.

DESCRIPTION OF THE PREFERRED EMBODIMENT

In order to best understand the present invention it is necessary to refer to the following description of its preferred embodiment in conjunction with the accompanying drawing. Referring to the drawing a transmissive phase retarder 10 in which reflection of an incident beam of light is substantially reduced and in which the incident light experiences a phase retardation between between the s- and p-plane polarization components of the transmitted light. The transmissive phase retarder 10 includes a transmissive substrate 11, such as glass, and a plurality of superimposed thin film transparent layers $12_k$ on the transmissive substrate 11. The adjacent layers $12_k$ of transparent layers are made of materials of substantially different indices of refraction, $n_i$. The optical thicknesses, $f_i$, of the transparent layers $12_k$ are prescribed accordingly to satisfy the transmission and retardation requirements in order to produce both maximum transmission and a specified phase shift, $\Phi_s$, in the s- and and p-plane polarization components of the transmitted light for a broadband range of wavelengths at a specified angle of incidence, $\theta_{0s}$, by minimizing a merit function by adjusting the optical thickness, $f_i$, of each layer wherein the merit function, $$M = \sum_{\lambda_i} \{[(\Phi_s - \Phi(f_i))/\Phi_t]^2 + [(1 - T_s(f_i))/T_{st}]^2 + [(1 - T_p(f_i))/T_{pt}]^2\},$$

where $\Phi(f_i)$, $T_s(f_i)$ and $T_p(f_i)$ are standard functions for determining the phase retardation, the transmission of the s-plane polarization component and the transmission of the p-plane polarization component, respectively, of transmitted light for a particular set of wavelengths, $\lambda_i$. The terms, $\Phi_t$, $T_{st}$ and $T_{pt}$, represent the tolerances within which an engineer may set the phase retardation, the transmission of the s-plane polarization component and the transmission of the p-plane polarization component, respectively, of the transmitted light. As is known in the art, the merit function M, may not only be a summation with respect to $\lambda_i$ but may also be a summation with respect to $\theta_{oi}$, the angles of incidence, or may be a double summation with respect to both $\lambda_i$ and $\theta_{oi}$.

In his article, entitled "Multilayer coating design achieving a broadband 90° phase shift," the inventor discusses the use of a coating design merit function and the use of a nonlinear least squares optimization algorithm for minimizing the merit function in order to adjust the optical thicknesses, $f_i$, so that a broadband 90° phase shift is obtained. The inventor has reviewed the essential features of the matrix theory of thin film analysis, which he used to evaluate complex reflectivities, both s- and p-plane polarization components of the reflected light, of a given multilayer design. Following that he has defined the coating design merit function which he has used in the optimization procedure. In the *Principles of Optics*, published by Pergamon Press in 1975 in London, England, pages 52–59, Max Born and Emil Wolf have discussed the matrix theory for stratified media.

The transmissive phase retarder 10 achieves the specified phase shifts, $\Phi_s$, within a set tolerance, $\Phi_t$, by fabricating each of the individual thin film transparent layers $12_k$ so that it has an actual thickness, $t_i$, in accordance with a particular prescription. Standard optical coating materials and transmissive substrates 11 may be used. Typically two coating materials, one with a low refractive index and one with a high refractive index, are used in an alternating fashion to form the multilayer configuration.

One way to determine the actual thicknesses, $t_i$, of the thin film transparent layers $12_k$ is to use an optimization approach, such as the coating design merit function, which is a technique that is familiar to those skilled in the art of optical design. In this approach, a set of optical thicknesses, $f_i$, are assumed and the amplitude transmission coefficients, $T_s(f_i)$ and $T_p(f_i)$ are calculated for the s- and p-plane polarization components, respectively, of the transmitted light by using a theory of wave propagation in stratified media and the phase difference, $\Phi(f_i)$, between the s- and p-plane polarization components of the transmitted light. From these calculations the coating design merit function is formed and it consists of a sum of squares of the differences between each of the specified values, $T_m$, which includes the specified values of the transmittances, 1.0 and 1.0 of the s- and p-plane polarization components of the transmitted light and the specified phase difference, $\Phi_s$, between the s- and p-plane polarization components of the transmitted light and each of the calculated values, $C_m$, which includes the calculated values of the transmittances, $C_{Ts}$ and $C_{Tp}$ of the s- and p-plane polarization components and the phase difference, $C_\Phi$ between the s- and p-plane polarization components of the transmitted light. The equation, $$M = \sum_m (T_m - C_m)^2,$$

represents the coating design merit function where $C_m$ are the calculated quantities of interest and are functions of the set of optical thicknesses, $f_i$, and $T_m$ are the target values for these calculated quantities. The next step is to adjust the set of optical thicknesses, $f_i$, in such a way to minimize the merit function M. To improve the results this procedure may be repeated many times. Nonlinear least squares methods may be used to find the optical thickness, $f_i$, for coatings which have the required properties. It is convenient to use a computer to perform these calculations.

One of the advantages of the present invention is that by increasing the number of thin film transparent layers $12_k$ in the design, it is possible to achieve improved performance in terms of a broader wavelength band, a wider range in the angle of incidence, $\theta_0$, and a wider range of phase retardation, $\Phi$. Furthermore the effectiveness of the present invention in achieving high transmission with phase shifts of the s- and p-plane polarization components of the transmitted light is evident in the following examples:

The first example is a twelve layer anti-reflection 90° phase shift coating for use at a 45° angle of incidence, $\theta_0$, which has a prescription for the actual physical thicknesses, $t_i$, of the thin film transparent layers $12_k$ which are given in Table I. The actual physical thicknesses, $t_i$, are determined from the data in Table I and the wavelength, $\lambda$, in accordance with the following equation: $t_i = f_i \lambda / 4(n_i^2 - \sin^2\theta_0)^{\frac{1}{2}}$ where $\lambda$ is the wavelength of the incident light, $f_i$ is the optical thickness, $n_i$ is the index of refraction, and $\theta_0$ is the angle of incidence in air, which is 45° for the first example. The optical thickness, $f_i$, of each of the thin film transparent layers $12_k$ is stated as a fraction of a quarter wavelength, $\lambda/4$, of the incident light. For the twelve layer anti-reflection coating of a 90° transmissive phase retarder 10 in the first example, the coating design of Table I, which applies for the wavelength, $\lambda = 10.6$ microns, uses zinc selenide (ZnSe) as the high refractive index coating material and thorium fluoride (ThF4) as the low refractive index coating material.

Table I provides the data for determining the actual layer thicknesses of the thin film transparent layers $12_k$ in order to form a twelve layer anti reflection 90° phase shift coating for use at 45° angle of incidence:

TABLE I

| Layer Number (i) | Optical Thickness ($f_i$) | Index of Refraction ($n_i$) |
| --- | --- | --- |
| Air | Massive | 1.000 |
| 01 | 0.724 | 2.403 |
| 02 | 0.620 | 1.35 |
| 03 | 0.650 | 2.403 |
| 04 | 0.772 | 1.35 |
| 05 | 0.725 | 2.403 |
| 06 | 0.911 | 1.35 |
| 07 | 0.751 | 2.403 |
| 08 | 0.798 | 1.35 |
| 09 | 0.690 | 2.403 |
| 10 | 0.657 | 1.35 |
| 11 | 0.680 | 2.403 |
| 12 | 0.734 | 1.35 |
| Substrate | Massive | 2.403 |

The transmittance and phase retardation relative to the angle of incidence for the coating configuration of the first example is shown in Table II. The coating configuration of the first example is designed to have high transmission and a substantially 90° phase retardation at a 45° angle of incidence, $\theta_0$, of the coating design of the first example. It is evident that a substantially 90° phase retardation results at 45° angle of incidence, $\theta_0$. The transmission, $T_s$ and $T_p$, of the s- and p-plane components of the transmitted light versus the angle of incidence, $\theta_0$, of the coating design of the first example is also shown in Table II. It is evident that high transmission occurs for the s- and p-polarization components of transmitted light at the 45° angle of incidence, $\theta_0$, within a set of predetermined tolerances for the transmission of the s- and p-plane polarization components of the transmitted light, $T_p$ and $T_s$, and the phase difference, $\Phi$, between the s- and p-plane polarization components of the transmitted light.

TABLE II

| Angle of Incidence ($\theta_0$) | $T_p$ | $T_s$ | Phase Retardation ($\Phi$) |
| --- | --- | --- | --- |
| 00° | 0.088 | 0.088 | 00.00° |
| 05° | 0.096 | 0.091 | 00.86° |
| 10° | 0.122 | 0.100 | 03.68° |
| 15° | 0.185 | 0.117 | 09.35° |
| 20° | 0.325 | 0.148 | 19.69° |
| 25° | 0.605 | 0.204 | 37.37° |
| 30° | 0.916 | 0.306 | 61.14° |
| 35° | 0.998 | 0.408 | 80.37° |
| 40° | 0.977 | 0.765 | 88.20° |
| 45° | 0.984 | 0.979 | 88.48° |
| 50° | 0.999 | 0.971 | 99.27° |
| 55° | 0.986 | 0.869 | 93.71° |
| 60° | 0.964 | 0.797 | 99.54° |

The second example is a ten layer transmissive phase retarder 10 which has high transmission, $T_p$ and $T_s$, of both the s- and p-plane polarization components of the transmitted light and a tunable phase retardation from 0° to 60° by adjusting the angle of incidence from 0° to 60°. The prescription for the actual layer thicknesses, $t_i$, of the thin film transparent layers $12_k$ is given in Table III. The actual physical thicknesses, $t_i$, are determined from the data in Table III and the wavelength, , in accordance with the following equation: $t_i = f_i \lambda / 4(n_i^2 - \sin^2\theta_0)^{\frac{1}{2}}$ where $\theta_0 = 45$ and the wavelength, $\lambda$, the transmissive substrate 11 and the coating materials are the same as used in the first example. Each layer thickness, $f_i$, is in a fraction of a quarter wavelength, $\lambda$, of the incident light. For the ten layer 60° phase retarder 10 the anti-reflection coating configuration is designed to have high transmission and a phase retardation that varied according to the angle of incidence, $\theta_0$.

TABLE III

| Layer Number (i) | Optical Thickness ($f_i$) | Index of Refraction ($n_i$) |
| --- | --- | --- |
| Air | Massive | 1.000 |
| 01 | 0.418 | 2.403 |
| 02 | 0.654 | 1.35 |
| 03 | 0.713 | 2.403 |
| 04 | 0.680 | 1.35 |
| 05 | 0.775 | 2.403 |
| 06 | 0.647 | 1.35 |
| 07 | 0.703 | 2.403 |
| 08 | 0.667 | 1.35 |
| 09 | 0.600 | 2.403 |
| 10 | 0.483 | 1.35 |
| Substrate | Massive | 2.403 |

The phase retardation, $\Phi$, versus the angle of incidence, $\theta_0$, of the second example is shown in Table IV. It is evident from Table IV that a phase retardation range from 0° to 60° may be attained by proper adjustment of the angle of incidence, $\theta_0$, from 0° to substantially 65°.

TABLE IV

| Angle of Incidence ($\theta_0$) | $T_p$ | $T_s$ | Phase Retardation ($\Phi$) |
| --- | --- | --- | --- |
| 00° | 0.957 | 0.957 | 00.00° |

TABLE IV-continued

| Angle of Incidence ($\theta_0$) | $T_p$ | $T_s$ | Phase Retardation ($\Phi$) |
|---|---|---|---|
| 05° | 0.963 | 0.960 | 00.97° |
| 10° | 0.978 | 0.970 | 03.74° |
| 15° | 0.992 | 0.983 | 07.93° |
| 20° | 0.997 | 0.993 | 12.99° |
| 25° | 0.996 | 0.998 | 18.49° |
| 30° | 0.993 | 0.996 | 24.22° |
| 35° | 0.994 | 0.990 | 30.21° |
| 40° | 0.997 | 0.984 | 36.44° |
| 45° | 0.997 | 0.982 | 42.64° |
| 50° | 0.995 | 0.982 | 48.40° |
| 55° | 0.993 | 0.979 | 53.34° |
| 60° | 0.995 | 0.963 | 57.32° |
| 65° | 0.998 | 0.918 | 60.42° |

The transmission, $T_s$ and $T_p$, of the s- and p-plane polarization components of the transmitted light versus the angle of incidence, $\theta_0$, of the coating design of the second example is also shown in Table IV. It is evident that this coating design produces high transmission over substantially a 60° variation of the angle of incidence, $\theta_0$. It is also evident that that this method of phase shift tuning applies to reflective thin film retarders.

The flexibility of the present invention in permitting transmissive phase retarders to be designed to meet a variety of specifications provides a significant advance in the art over fixed crystal retardation plates.

When reference is made to light it refers to all regions of the electromagnetic spectrum including ultraviolet, visible, infrared and microwave.

The use of the transmissive phase retarder 10 involves an incident beam of light making an angle $\theta_0$ to the normal of the coated surface of the transmissive substrate 11. The p-plane polarization component of an incident electric field vector represents the light which is contained in a plane defined by the ray vector of the beam of light which points in the direction of propagation and the normal of the surface containing the coating which the thin film transparent layers $12_k$ form. The s-plane polarization component of the incident electric field vector is traveling in a direction from out of the plane of the page in the drawing. After transmission through a coating of the transmissive phase retarder 10 the phase of one of the s- and p-plane polarization components is retarded with respect to the other one. The amount of phase retardation, $\Phi$, depends on the multilayer configuration and the angle of incidence, $\theta_0$. For example, suppose the incident beam of light was plane polarized in a plane at 45° from the surface normal. Such a beam would then have equal components of s- and p-plane polarization components. After transmission through a coating configuration of the transmissive phase retarder which is designed for a 90° phase retardation, the transmitted light would emerge in a circularly polarized state. Other amounts of phase retardation can be achieved by a specific design or by adjusting the angle of incidence on other designs. Other amounts of phase retardation, $\Phi$, may be achieved by using more than one phase shift coating in the path of incident beam of light. For example, if a coating forming an eighth wave phase retarder is deposited on each side of the same transmissive substrate 11 the transmitted light would experience a quarterwave phase retardation. Likewise, more than one transmissive phase retarder 10 can be used.

From the foregoing it can be seen that a transmissive phase retarder and a method for making the transmissive phase retarder have been described. The advantage of the present invention is that an engineer is not only able to control a variety of optical parameters in the formation of a transmissive phase retarder, but he is also able to set the tolerances for these optical parameters. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A transmissive phase retarder in which reflection of an incident beam of light is substantially reduced and in which the incident light experiences a phase retardation between the s- and p-plane polarization components of transmitted light, said transmissive phase retarder comprising:
    a transmissive substrate consisting of zinc selenide;
    a plurality of superimposed, thin film, transparent layers on said transmissive substrate, adjacent layers of which are made of materials of substantially different indices of refraction, said layers being selected from the group consisting of zinc selenide and thorium fluoride, the optical thicknesses of adjacent layers being different and selected to provide a 90° phase shift between said s- and p-plane polarization components of transmitted light.

2. The transmissive phase retarder of claim 1 wherein there are twelve thin film transparent layers on the transmissive substrate each having an optical thickness and index of refraction as set forth below:

| Layer Number | Optical Thickness | Index of Refraction |
|---|---|---|
| 01 | 0.724 | 2.403 |
| 02 | 0.620 | 1.35 |
| 03 | 0.650 | 2.403 |
| 04 | 0.772 | 1.35 |
| 05 | 0.725 | 2.403 |
| 06 | 0.911 | 1.35 |
| 07 | 0.751 | 2.403 |
| 08 | 0.798 | 1.35 |
| 09 | 0.690 | 2.403 |
| 10 | 0.657 | 1.35 |
| 11 | 0.680 | 2.403 |
| 12 | 0.734 | 1.35 |
| Substrate | | 2.403 |

3. The transmissive phase retarder of claim 2 wherein the substrate and odd-numbered layers are zinc selenide and the even-numbered layers are thorium fluoride.

4. The transmissive phase retarder of claim 1 wherein there are ten layers on the substrate each having an optical thickness and index of refraction as set forth below:

| Layer Number | Optical Thickness | Index of Refraction |
|---|---|---|
| 01 | 0.418 | 2.403 |
| 02 | 0.654 | 2.46 |
| 03 | 0.713 | 2.403 |
| 04 | 0.680 | 1.35 |
| 05 | 0.775 | 2.403 |
| 06 | 0.647 | 1.35 |
| 07 | 0.703 | 2.403 |
| 08 | 0.667 | 1.35 |
| 09 | 0.600 | 2.403 |
| 10 | 0.483 | 1.35 |
| Substrate | | 2.403 |

5. The transmissive phase retarder of claim 4 wherein the substrate and odd-numbered layers are zinc selenide and the even-numbered layers are thorium fluoride.

* * * * *